(12) United States Patent
Högler et al.

(10) Patent No.: US 9,663,069 B2
(45) Date of Patent: May 30, 2017

(54) METHOD FOR THE ACTIVATION OF A WINDSCREEN WIPER MOTOR

(71) Applicant: Valeo Systèmes d'Essuyage, Le Mesnil Saint Denis (FR)

(72) Inventors: Eberhard Högler, Erligheim (DE); Rainer Siedler, Talheim (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 734 days.

(21) Appl. No.: 13/663,551

(22) Filed: Oct. 30, 2012

(65) Prior Publication Data

US 2013/0127389 A1    May 23, 2013

(30) Foreign Application Priority Data

Oct. 31, 2011   (DE) ......................... 10 2011 054 953

(51) Int. Cl.
*H02P 1/04*    (2006.01)
*B60S 1/08*    (2006.01)

(52) U.S. Cl.
CPC ............... *B60S 1/08* (2013.01); *B60S 1/0859* (2013.01)

(58) Field of Classification Search
USPC ................... 318/443, 444, 445, 483, DIG. 2; 15/250.12, 250.13, 250.14, 250.15,
(Continued)

(56) References Cited

U.S. PATENT DOCUMENTS

| | | | | |
|---|---|---|---|---|
| 4,705,997 A | * | 11/1987 | Juzswik | H02P 7/0044 318/293 |
| 4,728,870 A | * | 3/1988 | Hirano | B60S 1/482 15/250.17 |

(Continued)

FOREIGN PATENT DOCUMENTS

| | | |
|---|---|---|
| DE | 4417371 A1 | 11/1995 |
| DE | 19650491 A1 | 6/1997 |

(Continued)

OTHER PUBLICATIONS

Search Report issued in German Application No. 102011054953.6, mailed on Jul. 11, 2012 (3 pages).

(Continued)

*Primary Examiner* — Eduardo Colon Santana
*Assistant Examiner* — Iftekhar Mustafa
(74) *Attorney, Agent, or Firm* — Osha Liang LLP

(57) ABSTRACT

A method for the activation of a windscreen wiper motor is disclosed, in which the motor is connected to a wiper blade by a drive shaft, which moves the wiper blade between two reversal points of a wiping field in differing movement direction, where the rotation speed and direction of the motor, or the speed of the wiper blade, is detected by a sensor device and is supplied to a control device as an input value. The motor, before reaching the respective reversal point, is switched off, whereupon the drive shaft continues to rotate further by a castor angle up to a standstill, and the wiper blade moves further by a trailing distance. The actual speed of the wiper blade is compared at the switch-off time with a nominal speed, and the motor is operated further for a period of time when the comparison results in a difference in values.

5 Claims, 1 Drawing Sheet

Figure 1:
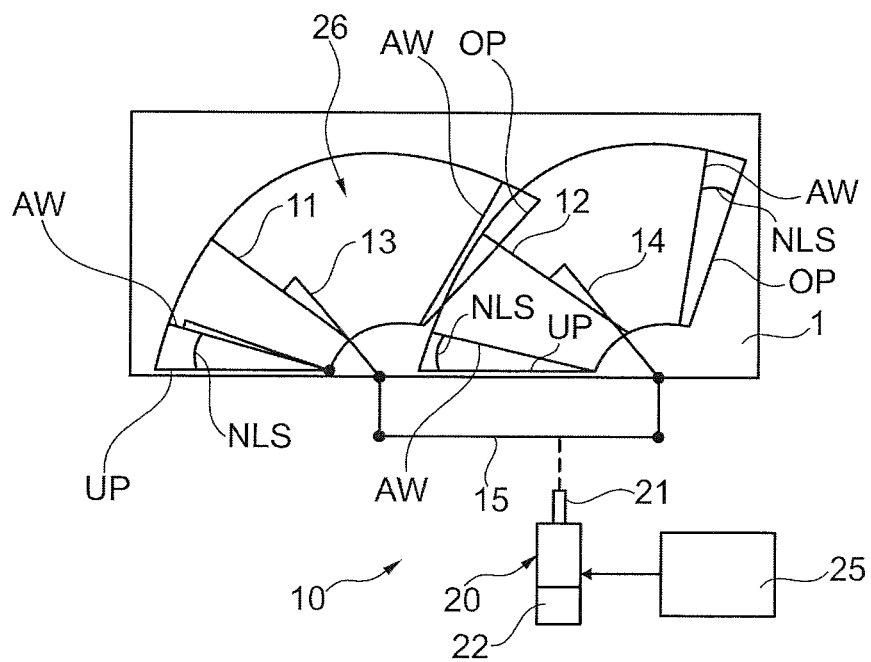

(58) Field of Classification Search
USPC .......................................... 15/250.16, 250.17
See application file for complete search history.

(56) References Cited

U.S. PATENT DOCUMENTS

| | | | | |
|---|---|---|---|---|
| 4,918,272 A | * | 4/1990 | Nishikawa | B60S 1/08 200/252 |
| 6,249,098 B1 | * | 6/2001 | Miyazaki | B60S 1/08 15/250.12 |

FOREIGN PATENT DOCUMENTS

| | | | |
|---|---|---|---|
| DE | 19710099 A1 | | 9/1998 |
| DE | 69919837 T2 | | 9/2005 |
| GB | 2311208 A | | 9/1997 |
| JP | H11-11259 A | | 1/1999 |
| JP | 2009-274576 A | | 11/2009 |
| JP | 2011218998 A | * | 11/2011 |

OTHER PUBLICATIONS

The Second Office Action issued in corresponding Chinese Patent Application No. 201210595780.X, issued on Dec. 23, 2016 (11 pages).

\* cited by examiner

METHOD FOR THE ACTIVATION OF A WINDSCREEN WIPER MOTOR

PRIOR ART

The invention relates to a method for the activation of a windscreen wiper motor according to the preamble of claim 1.

Such a method is already generally known from practice and serves to ensure that the wiper blade or wiper blades of a windscreen wiper drive cleans/clean the desired wiping field. For this purpose, the windscreen wiper motor is switched off to a specific position of the wiper blade or wiper blades. At the switch-off time, in this context the windscreen wiper motor is short-circuited, wherein the windscreen wiper motor or the drive shaft of the windscreen wiper motor is still moved on by a specific castor angle owing to the inertia in the system. This castor angle is heavily dependent, on the one hand, on the windscreen wiper basic speed, that is to say, in particular, on the speed stage at which the windscreen wiper is operated, and, on the other hand, on the frictional conditions between the wiper blade or the wiper blades and the windscreen. In the case of a wet or moist windscreen, the castor angle is therefore larger, owing to the friction between the wiper blade or the wiper blades and the windscreen which is reduced compared to a dry windscreen, than in dry conditions. This means in practice that the drive of the windscreen wiper motor is always switched off or short-circuited at the same angle or a specific position of the wiper blade or wiper blades on the windscreen, but the wiping field which is actually produced or cleaned by the wiper blade or wiper blades is dependent on the abovementioned factors. It is to be noted here that owing to the geometric conditions of the windscreen wiper drive or the windscreen, contact between the wiper blades has to be avoided, and impacting of the wiper blade against the edge of the windscreen is also undesired. For this reason, in practice the switch-off time is defined such that the above-mentioned disruption does not occur even under very different conditions.

DISCLOSURE OF THE INVENTION

Taking the illustrated prior art as a starting point, the invention is based on the object of developing a method for the activation of a windscreen wiper motor according to the preamble of claim 1 in such a way that a wiping field which is of the same size is as far as possible produced by the wiper blade or wiper blades irrespective of, in particular, the frictional conditions between the wiper blade or wiper blades and the windscreen. This object is achieved according to the invention with a method for the activation of a windscreen wiper motor having the features of claim 1 in that the actual speed of the at least one wiper blade is compared at the switch-off time with a nominal speed, and that with a difference between the actual value from the nominal value, the windscreen wiper motor is operated further for a period of time which is defined in the control device. In other words, this means that the drive of the windscreen wiper motor is either short-circuited as a function of the rotational speed of the windscreen wiper motor (or the wiping speed of the wiper blade or wiper blades) actually detected at the switch-off time, if there is no difference between the actual rotational speed or actual speed and the nominal rotational speed or nominal speed or else in the case of a deviation the windscreen wiper motor continues to be driven i.e. supplied with voltage, for a defined period of time.

Advantageous developments of the method according to the invention for the activation of a windscreen wiper motor are specified in the dependent claims. All the combinations of at least two features which are disclosed in the claims, the description and/or the figures, come within the scope of the invention.

The activation of the windscreen wiper motor or the operation of the windscreen wiper motor is preferably carried out by the control device by means of pulse width modulation of the supply voltage of the windscreen wiper motor. Therefore, for example the value of 50% of the pulse width modulation means that the supply voltage is switched on and switched off during time periods which are respectively the same length, with the result that the windscreen wiper motor is operated with half its maximum speed. In contrast, a value of 100% for the pulse width modulation means that the voltage supply of the windscreen wiper motor is always on, i.e. that the windscreen wiper motor is operated at its full rotational speed.

In a particularly preferred refinement of the method according to the invention it is proposed that during the defined period of time, the value of the pulse width modulation is constant. Such a method can be particularly easily programmed or configured.

However, it is also possible to provide that during the defined period of time, the value of the pulse width modulation is reduced from an initial value to zero, preferably continuously. Such a method permits the operation of the windscreen wiper motor to be optimized or a very gentle operation of the windscreen wiper motor.

In the event of the actual value of the detected rotational speed or speed being between two limiting values which are stored in the control device, the value of the pulse width modulation for operation during the defined time period is calculated, in particular, as a function of the difference between the actual value and the nominal value.

Figure 2:
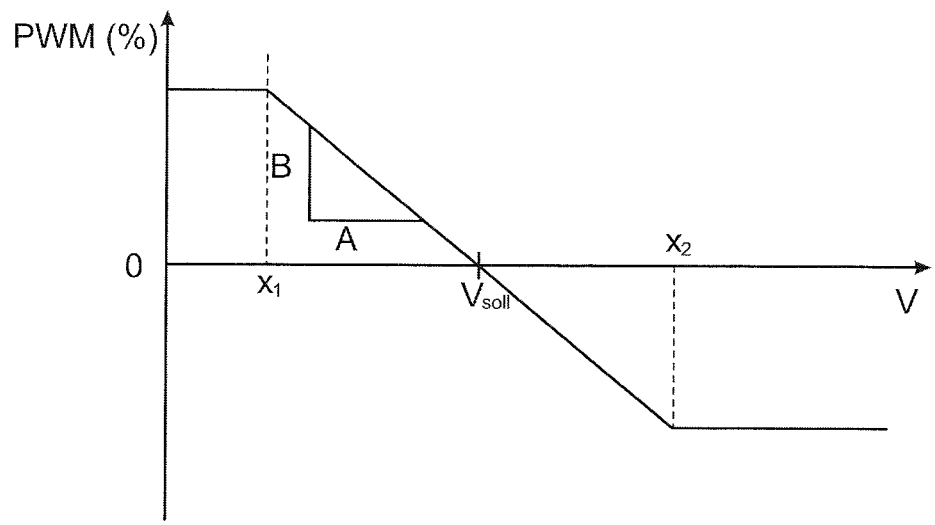

Further advantages, features and details of the invention can be found in the following description of preferred exemplary embodiments and with reference to the drawing, in which:

FIG. 1 shows a simplified illustration of a windscreen wiper drive for cleaning a windscreen and using two wiper blades, and FIG. 2 shows a diagram explaining the determination of the value for the activation of the windscreen wiper motor after the switch-off time.

FIG. 1 shows a highly simplified view of a windscreen wiper device 10 in a motor vehicle for cleaning a windscreen 1. The windscreen wiper device 10 comprises two wiper blades 11, 12 which are connected via wiper arms 13, 14 and a wiper linkage 15 to at least one windscreen wiper motor 20. The windscreen wiper motor 20 has a drive shaft 21 which serves to move the wiper blades 11, 12 by means of the wiper linkage 15. The windscreen wiper motor 20 also comprises a sensor device 22 (not illustrated in detail) for detecting the rotational speed and the direction of rotation of the drive shaft 21 or of the windscreen wiper motor 20. Such means may comprise, for example, Hall sensors or the like.

Furthermore, a control device 25 is provided which serves to activate the windscreen wiper motor 20. The control device 25 can be embodied here either as a separate control device 25, as is illustrated in FIG. 1, or else as a control device 25 which is embodied integrated in the housing of the windscreen wiper motor 20.

A lower reversal point UP and an upper reversal point OP are shown for each of the two wiper blades 11, 12 in FIG. 1. The two wiper blades 11, 12 are moved to and fro between these two reversal points UP and OP, wherein a wiping field 26 over which the wiper blades 11, 12 pass is produced. The movement of the wiper blades 11, 12 is controlled by corresponding activation of the windscreen wiper motor 20 by means of the control device 25, wherein, depending on the direction of movement of the wiper blades 11, 12, the drive shaft 21 of the windscreen wiper motor 20 is moved either in one direction or in the other direction.

The windscreen wiper motor 20 is activated by the control device 25 by means of a pulse width modulation method, in which the speed of the drive shaft 21 is controlled as a function of the ratio between the (full) supply voltage of the windscreen wiper motor 20 with its operating voltage and the switching off of the voltage supply. It is essential that the windscreen wiper motor 20 is short-circuited before the respective reversal point UP, OP is reached at a switch-off time ASZ, i.e. that the value of the pulse width modulation is 0% at the respective reversal point UP, OP. The position of the wiper blades 11, 12 at the switch-off time ASZ of the windscreen wiper motor 20 is denoted by the position AW of the wiper blades 11, 12 in FIG. 1.

Owing to inertias of the system and, in particular, owing to different frictional conditions between the wiper blades 11, 12 and the windscreen 1, a castor angle α of the drive shaft 21 or a trailing distance NLS of the wiper blades 11, 12 is produced, wherein the trailing distance NLS of the wiper blades 11, 12 denotes the distance between the position AW of the wiper blades 11, 12 and the reaching of the reversal point UP, OP.

In FIG. 1 it is assumed by way of simplification that the trailing distance NLS is respectively the same at the two wiper blades 11, 12 and in the region of the two reversal points UP, OP. Of course, the values can, however, also be different for the two reversal points UP, OP. When the wiper blades 11, 12 are driven by means of a separate windscreen wiper motor 20 in each case, the trailing distance NLS for the two wiper blades 11, 12, can also be different.

In order to keep the value of the castor angle α of the drive shaft 21 or of the trailing distance NLS of the wiper blades 11, 12 as constant as possible irrespective of, in particular, the frictional conditions between the wiper blades 11, 12 and the windscreen 1, and therefore always generate a wiping field 26 which is as far as possible of the same size, there is provision according to the invention that the rotational speed of the windscreen wiper motor 20 is detected at the switch-off time ASZ by the sensor device 22. This value of the rotational speed also corresponds to a specific speed v of the wiper blade 11, 12 on the windscreen 1. For the switch-off time ASZ, a nominal value $v_{soll}$ for the speed (or the rotational speed of the windscreen wiper motor 20) which is larger than 0 is stored or predefined in the control device 25 since at the switch-off time ASZ the wiper blades 11, 12 still continue to move in their original direction. This means that at the switch-off time ASZ, the wiper blades 11, 12 move even though the windscreen wiper motor 20 is short-circuited, that is to say that the value of the pulse width modulation is 0%. According to the invention, the control device 25 then carries out a comparison between the actual value $v_{ist}$ and the nominal value $v_{soll}$ of the speed v of the wiper blades 11, 12 (or of the rotational speed of the windscreen wiper motor 20).

For the sake of clarification, reference is now made to FIG. 2 in which the pulse duty factor of the pulse width modulation PWM is illustrated (in %) for different speeds $v_{ist}$ of the wiper blades 11, 12 (or the rotational speed of the windscreen wiper motor 20) at the switch-off time ASZ: if the actual value of the speed v of the wiper blades 11, 12 at the switch-off time ASZ corresponds precisely to the nominal value (value of the pulse width modulation=zero), the resulting PWM duty cycle is 0%.

If, in contrast, the speed v at the switch-off time ASZ drops below a lower limiting value x1 or said speed v exceeds an upper limiting value x2, a positive or negative maximum constant value PVW of the pulse width modulation is used on the basis of the graph (or data record) of the pulse width modulation which is illustrated in FIG. 2 and stored in the control device 25, which constant value PVW continues to operate the windscreen wiper motor 20 after the switch-off time ASZ, for a defined period of time ΔT which is also stored in the control device 25.

In the intermediate region between the two limiting values x1, x2, in which the actual value of the speed v of the wiper blades 11, 12 deviates from the nominal value (but is still within the limiting values x1, x2), the value PWM of the pulse width modulation is determined, in accordance with FIG. 2, according to the formula:

$$PWM = -(B/A) \times (v(\text{ist}) - v(\text{soll}))$$

The value PWM of the pulse width modulation is therefore adapted as a function of the deviation of the actual value of the speed v of the wiper blades 11, 12 from the nominal value at the switch-off time ASZ.

In this context, irrespective of the identified value PWM of the pulse width modulation the latter is not changed during this period of time ΔT. This means that when the speed v of the wiper blades 11, 12 is undershot by a nominal value at the switch-off time ASZ during the period of time ΔT, the windscreen wiper motor 20 is operated once more for a brief time in order to permit a somewhat increased run-on of the wiper blades 11, 12. In contrast, when the speed v of the wiper blades 11, 12 is exceeded at the switch-off time ASZ, a negative value PWM of the pulse width modulation is produced, with the result that the wiper blades 11, 12 are actively braked so that the run-on of the wiper blades 11, 12 is reduced.

It is also possible to provide that the respectively determined value PWM of the pulse width modulation is not constant, as described above, during the specific period of time ΔT but instead is returned from the identified value PWM according to FIG. 2, in particular, to the value 0. This makes it possible to achieve a particularly gentle operation of the windscreen wiper motor 20.

The method according to the invention for the activation of a windscreen wiper motor 20, described so far, can be refined or modified in various ways without departing from the inventive idea. It is therefore possible, of course, for a windscreen wiper device 10 to have two separate windscreen wiper motors 20 without a wiper linkage 15 which couples the two wiper blades 11, 12 to one another, said windscreen wiper motors 20 being coupled to the respective wiper blade 11, 12. In this case, individual activation/adaptation of the respective windscreen wiper motor 20 takes place. The method is, of course, also suitable, for example, for rear windscreen wipers.

LIST OF REFERENCE SYMBOLS

1 Windscreen
10 Windscreen wiper device
11 Wiper blade
12 Wiper blade

13 Wiper arm
14 Wiper arm
15 Wiper linkage
20 Windscreen wiper motor
21 Drive shaft
22 Sensor device
25 Control device
26 Wiping field
UP Lower reversal point
OP Upper reversal point
AW Position
ASZ Switch-off time
NLS Trailing distance
v Speed
x1 Lower limiting value
x2 Upper limiting value
α Castor angle
ΔT Defined period of time

The invention claimed is:

1. A method for the activation of a windscreen wiper motor, in which the windscreen wiper motor is connected via a drive shaft at least indirectly with at least one wiper blade, the method comprising:
moving, by the windscreen wiper motor, the at least one wiper blade back and forth between two reversal points of a wiping field in differing movement direction;
detecting a rotation speed and a rotation direction of the windscreen wiper motor or, respectively, a speed of the at least one wiper blade using a sensor device; and
supplying, to a control device as an input value, the detected speed and/or direction, wherein the windscreen wiper motor, before reaching the respective reversal point, is switched off at a switch-off time, whereupon the drive shaft of the windscreen wiper motor continues to rotate further by a castor angle up to a standstill of the windscreen wiper motor, and the at least one wiper blade continues to move further by a trailing distance, and
wherein an actual speed of the at least one wiper blade is compared at the switch-off time with a nominal speed, and with a difference between the actual value from the nominal value, the windscreen wiper motor is operated further for a period of time which is defined in the control device, as needed for the at least one wiper blade to reach the respective reversal point.

2. The method according to claim 1, wherein the activation of the windscreen wiper motor by the control device takes place by pulse width modulation.

3. The method according to claim 2, wherein during the defined period of time, a value of the pulse width modulation is constant.

4. The method according to claim 2, wherein during the defined period of time, the value of the pulse width modulation is continuously reduced from an initial value to zero.

5. The method according to claim 3, wherein in the case of a deviation of the actual value of the speed ($v_{ist}$) from the nominal value of the speed ($v_{soll}$) at the switch-off time, the value of the pulse width modulation (PWM) is calculated according to the formula:

$$PWM = -(B/A) \times (v_{ist} - v_{soll}),$$

wherein A and B are scaling factors,
when the actual value of the speed is between a lower threshold value and an upper threshold value.

* * * * *

UNITED STATES PATENT AND TRADEMARK OFFICE
CERTIFICATE OF CORRECTION

PATENT NO. : 9,663,069 B2  
APPLICATION NO. : 13/663551  
DATED : May 30, 2017  
INVENTOR(S) : Hogler et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 814 days.

Signed and Sealed this
Third Day of April, 2018

Andrei Iancu
*Director of the United States Patent and Trademark Office*